Oct. 28, 1941.

M. V. TRACY 2,260,421

PORTABLE TABLE SAW

Filed April 18, 1938

INVENTOR
M.V.Tracy

ATTORNEY

Oct. 28, 1941.   M. V. TRACY   2,260,421
PORTABLE TABLE SAW
Filed April 18, 1938   2 Sheets-Sheet 2

INVENTOR
M. V. Tracy
ATTORNEY

Patented Oct. 28, 1941

2,260,421

UNITED STATES PATENT OFFICE 2,260,421

PORTABLE TABLE SAW

Mearl V. Tracy, Sacramento, Calif., assignor of one-half to Marion M. Tracy, Pasadena, Calif.

Application April 18, 1938, Serial No. 202,699

1 Claim. (Cl. 143—47)

This invention relates in general to a motor driven wood-working saw, and in particular the invention is directed to an improved portable table saw of the electric motor driven type.

The principal object of my invention is to provide a portable table saw, which is so designed that it may be used conveniently on a job either outside or inside the building being constructed, the unit being relatively light in weight and arranged so that the work is engaged with a stationary fence, while the saw supporting table moves relative to the work, to advance the saw to and from said work.

Another object of my invention is to provide a portable table saw wherein the saw and motor assembly may be a standard electric handsaw, the mounting of the same being accomplished by removing the usual work engaging shoe from the mounting block on the motor case and substituting a cooperating supporting bracket on the table.

An additional object of the invention is to provide a portable table saw including a fence which is mounted for adjustment to function either as a rip fence or as a mitre gauge, selectively.

A further object is to provide switch means arranged to shut off the motor current after a cut has been made and the saw table fully retracted, and to turn on the current before the saw reaches the work, with the advance of the table.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Referring now more particularly to the characters of reference on the drawings, the device comprises a rectangular supporting frame of box like configuration and including sheet metal side panels 1 secured in laterally spaced relation by sheet metal end panels 2; these end panels 2 terminating at their upper edges short of the upper edges of the side panels. End panels 2 are flanged inward at top and bottom, as shown at 2a and 2b, and are secured to the side panels by vertically spaced tie bolts 3.

Figure 1:
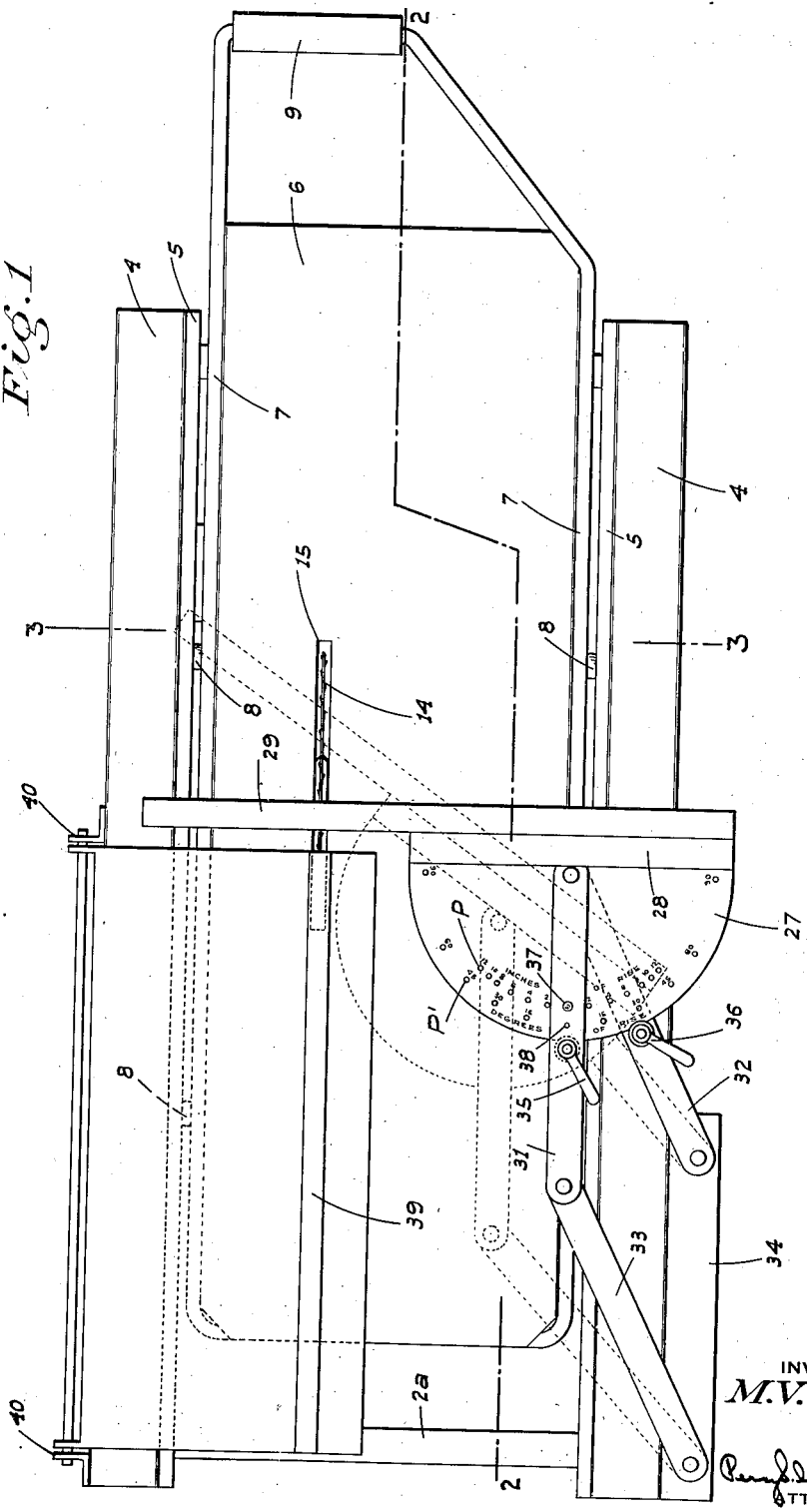
Figure 1 is a top plan view of my improved portable table saw.
Figure 4:
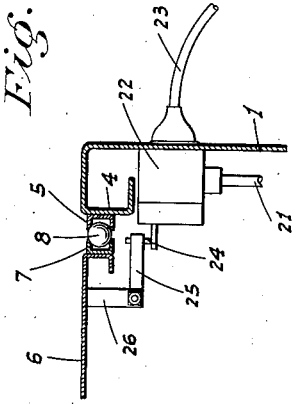
Figure 4 is a fragmentary section on line 4—4 of Fig. 2.
Figure 3:
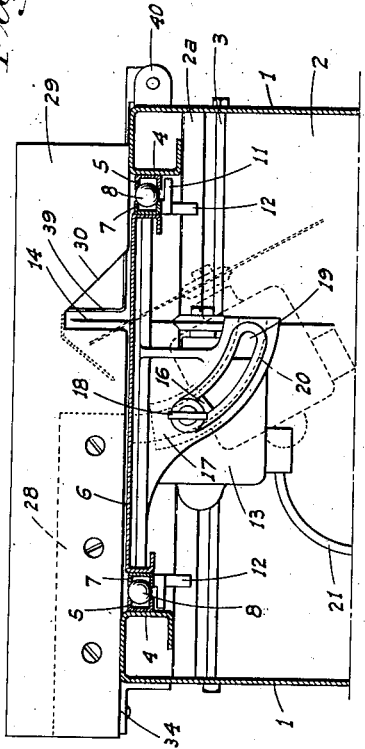
Figure 3 is a cross section taken on line 3—3 of Fig. 1.
Figure 2:
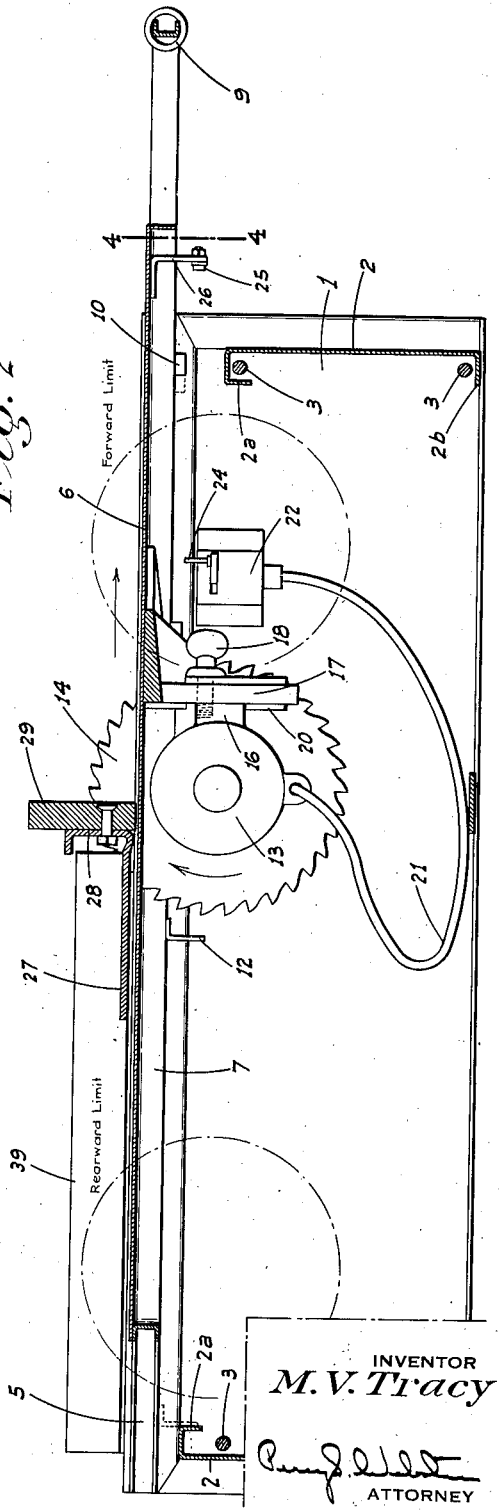
Figure 2 is a sectional elevation on line 2—2 of Fig. 1.

An integral strengthening beam 4 is formed, by bending along the upper edge of each side panel for the length thereof, and extending inwardly therefrom. Inwardly facing channels 5 are fixed horizontally on the inner face of beams 4, while a sliding table 6, including outwardly facing channels 7 mounted on its side edges in spaced and opposed relation to channels 5, is slidably supported by a plurality of longitudinally spaced steel balls 8, which are of sufficient size to ride in the opposed channels. The channels 7 extend beyond the forward end of table 6, and support a transversely disposed operating handle 9. As so mounted, the table—which is practically flush with the top surface of beams 4—can be advanced or retracted in a horizontal plane through the limit of movement illustrated in Fig. 2. Suitable cooperating stop elements 10 and 11, on channels 5 and 7 respectively, limit advancing movement of the table 6, and a stop element 12 is arranged to engage flanged portion 2a of the rear end panel and to limit retracting movement of the table.

A motor 13 of standard electric hand saw type is supported beneath table 6 in the following manner and with the shaft mounted saw blade 14 projecting through a saw slot 15 cut longitudinally of the table. The motor is disposed with its shaft transversely of the table, there being a mounting block 16 already on one side of the motor case. This mounting block is adjustably and slidably secured to arcuately slotted bracket 17, which depends from the table, by means of a holding and clamping bolt 18. The bolt 18 passes through slot 19 in the bracket, and such slot curves downwardly and rearwardly from its upper end, so that with movement of bolt 18 down the slot, the motor shaft is angled relative to a horizontal plane and blade 14 angled relative to a vertical plane for angle cuts. The bracket engaging face of block 16 is formed as usual with an arcuate guide groove, which cooperates with corresponding arcuate guide rib 20 on the bracket through which the slot 19 extends. This arrangement assures proper positioning of the saw for straight or angle cuts.

The flexible motor cord 21 leads to a switch box 22 mounted on the inner face of one side panel 1 and provided with a plug-in socket opening through said panel, and for detachable engagement with a supply cord 23. A switch actuating trigger 24 for a snap switch in the box extends inwardly from said box, and is disposed in the path of a resilient tripping finger 25 mounted on a bracket 26 depending from the table. The finger 25 is so disposed as to engage trigger 24 and close the switch when the table is advanced and just before the saw reaches the work under which the table slides, and to reengage the trigger and open the switch as the table retracts and approaches a fully retracted position.

The combination mitre gauge and rip fence unit comprises a semi-circular plate 27, which extends from a point clear of the circular saw across a portion of the table and the surface of the adjacent beam 4. The forward and straight edge of plate 27 is turned up to form a securing flange 28, to which is bolted a wooden fence 29, which is of at least a length to extend across the width of the table. A cutaway notch 30 is provided for the passage of the saw.

A link 31 disposed on top of plate 27 is pivoted at its forward end to the plate at the center of the arc of said plate, while another link 32 is disposed beneath the plate and likewise pivoted. A third link 33 is pivoted at one end on the rear end of link 31, links 32 and 33 being disposed parallel and extending rearwardly and outwardly to spaced pivotal connection with a flange 34 projecting outward from the adjacent beam 4, and at the rear end portion thereof. As links 31 and 32 are engaged with opposite sides of the plate 27, such links do not interfere with each other and the fence 29 can be adjusted for straight cross cutting, mitre cutting or ripping of the work, as is obvious.

Clamping devices 35 and 36 are provided to adjustably secure links 31 and 32, respectively, with plate 27 in any desired position; the plate being graduated both for "degrees of rise" and "inches of rise" as shown, there being corresponding arcuate rows of perforations indicated at P and P1. A locating pin 37 is used to set link 31 in any selected position, the pin engaging in any one of the perforations in rows P or P1; there being a separate pin receiving hole 38 in link 31 to register with each row of perforations.

A saw-guard 39 of conventional type may be used if desired, and in such event the guard is pivoted on spaced ears 40 for swinging movement, in a transverse plane, to and from a saw-guarding position. When not in use, the guard hangs alongside the frame.

In the operation of the device, the work to be cut is held by one hand against fence 29, which has previously been set up to the desired position. The operator then grasps handle 9 and advances the table. As the table advances, the motor will be energized, as heretofore described, and the work cut. Thereafter, with retraction of the table, the motor is shut off.

The entire operation of the device is simple, and requires a minimum of effort, and as the saw moves to the work, such work— even though of relatively great length, can be cut with ease.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claim.

Having thus described my invention, what I claim as new and useful and desire to secure by Letters Patent is:

In a table saw having a motor-driven saw supporting table mounted for movement through a stroke of predetermined length and a switch for controlling the circuit of the motor having a snap-action operating trigger projecting from the switch for movement in a plane lengthwise of the travel of the table; a means to operate the trigger comprising a resilient finger mounted on the table in position to engage and move the trigger in one direction or the other and to then pass by and disengage the trigger, with the movement of the table to a point near but before reaching its limit of movement in one direction.

MEARL V. TRACY.